US006952577B2

(12) United States Patent
Michaelis et al.

(10) Patent No.: US 6,952,577 B2
(45) Date of Patent: Oct. 4, 2005

(54) AUDITORY METHODS FOR PROVIDING INFORMATION ABOUT A TELECOMMUNICATION SYSTEM'S SETTINGS AND STATUS

(75) Inventors: Paul Roller Michaelis, Louisville, CO (US); John W. Soltes, Ocean Township, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 542 days.

(21) Appl. No.: 10/124,121

(22) Filed: Apr. 16, 2002

(65) Prior Publication Data

US 2003/0194080 A1 Oct. 16, 2003

(51) Int. Cl.[7] .................................................. H04Q 7/20
(52) U.S. Cl. .................................. 455/414.1; 455/432.3
(58) Field of Search ........................... 455/414.1, 432.2, 455/432.3, 415–417, 445, 70; 379/161, 164, 157, 114.05, 207.2; 340/7.41, 7.43, 7.55

(56) References Cited

U.S. PATENT DOCUMENTS

| | | | | | |
|---|---|---|---|---|---|
| 5,577,103 | A | * | 11/1996 | Foti | 455/412.1 |
| 5,839,065 | A | * | 11/1998 | Joensuu et al. | 455/445 |
| 6,029,065 | A | * | 2/2000 | Shah | 455/414.4 |
| 6,108,540 | A | * | 8/2000 | Sonti et al. | 455/433 |
| 6,301,473 | B1 | * | 10/2001 | Nguyen et al. | 455/417 |
| 6,381,454 | B1 | * | 4/2002 | Tiedemann et al. | 455/419 |
| 6,493,430 | B2 | * | 12/2002 | Leuca et al. | 379/88.12 |
| 6,795,702 | B2 | * | 9/2004 | Sennett | 455/414.1 |
| 2003/0123593 | A1 | * | 7/2003 | Creamer et al. | 375/368 |

* cited by examiner

*Primary Examiner*—Jean Gelin
(74) *Attorney, Agent, or Firm*—Sheridan Ross P.C.

(57) ABSTRACT

The present invention is directed to a method and apparatus for providing to a user at least one of setting and status information associated with a telecommunication device. The method includes and the apparatus performs the steps of receiving a request for the at least one of setting and status information, collecting the requested at least one of setting and status information, and providing the requested at least one of setting and status information to the user, via an auditory method.

42 Claims, 3 Drawing Sheets

AUDITORY METHODS FOR PROVIDING INFORMATION ABOUT A TELECOMMUNICATION SYSTEM'S SETTINGS AND STATUS

FIELD OF THE INVENTION

The present invention relates generally to user interfaces for telephony systems and specifically to a user interface for telephony systems that provides desired information about a telecommunication device's settings and/or status.

BACKGROUND OF THE INVENTION

Telecommunication devices, such as wired and wireless telephones, softphones, speakerphones and mobile telephones typically have a variety of settings for device features/functions and for temporally changing the status of communication device operations. Communication device settings include, for example, speaker or microphone volume level, whether the speaker or microphone is activated, whether call forwarding is activated, the date and time settings, whether do not disturb is activated, the coverage path (i.e., where incoming calls will be forwarded if they are not answered), the starting and stopping times for time-dependent settings, the extent to which the battery is charged and/or the time remaining on the charge and the digital encoding algorithm currently in use (e.g., G.711, G.729, etc.). Communication device operational statuses include, for example, what, if any, lines are active, what lines have callers on hold, whether any new or old messages are enqueued, identification information associated with callers, the duration of the call, the length of time a call has been on hold, and the number or names of parties on a conference call. Information about settings and statuses of the communications device is typically obtained visually by enabled/disabled LEDs or LCDs and/or by textual or graphic information on a CRT/VDT display.

In many applications, information about the feature settings and operational status of a communication device, such as a telephone, is difficult for users to obtain. Visually impaired people, for example, cannot see the statuses of the LEDs, LCD's or CRTs/VDTs. Older telephones used electro-mechanical or locking buttons, such as the Western Electric 1A2 key system, which are tactilely discernible by visually impaired users. Such buttons have been replaced by momentary-contact, non-locking buttons for reasons of cost and the inability to remotely enable or disable the function corresponding to the buttons' physical positions. Many governments are now requiring information associated with communication devices to be accessible by the visually impaired. As of Jun. 25, 2001, for example, Section 508 of the U.S. Rehabilitation Act of 1998 requires communication devices supplied to the U.S. government to have mechanically operated controls or keys that are discernible not only visually but also through touch or sound. A viable solution is urgently required to comply with such governmental requirements. In other applications, the increasing miniaturization of communication devices has presented difficulties for users to obtain setting and status information. The devices are often too small for users to readily and conveniently discern desired setting and status information. In yet other applications, users have difficulty in obtaining setting and status information due to remote access of a telephony system from an endpoint with limited display capabilities. An example of the former case is a situation where an employee seeks to access an office telephony system from a remote telephone. From the remote telephone, the employee is often unable to acquire status information about the current configuration of the telephony system, e.g., who is holding on what line, etc. An example of the latter case is a situation where a wireless telephone user is driving while trying to manipulate a wireless phone.

SUMMARY OF THE INVENTION

These and other needs are addressed by the various embodiments and configurations of the present invention. The assistant of the present invention collects and provides setting and/or status information about a telecommunication device (e.g., an endpoint or telephone) to a user in response to a query from the user for the information. In one configuration, the query is made by voice or DTMF signals and the collected setting and/or status information is output to the user as an audio stream through a speaker or receiver of the user's telecommunication device. The type of information collected can be defined in a predetermined or user configurable script or interactively determined between the user and the assistant. The information can be collected and provided even during an active conversation with another party. To avoid inconveniencing the other party to the call, the assistant can mute the microphone or attenuate and restore the receive volume of the telecommunication device. The assistant can be configured to alter a reported setting or status at the request of the user.

The method and apparatus of the present invention can have a number of advantages over the prior art. First, the present invention can provide a viable, cost effective solution to permit the visually impaired to obtain setting and status information. The solution complies with governmental requirements, including Section 508 of the Rehabilitation Act of 1998. Second, the present invention can permit higher levels of miniaturization of telecommunication devices. The present invention can permit the implementation of a fully voice operated telecommunications device, which can reduce the number of (or eliminate entirely) keys. Third, the present invention can permit remote users to access setting and status information, even from telecommunication devices that lack visual indications of such information. Fourth, the present invention can permit users to access conveniently setting and status information, even when involved in other activities, such as driving. Fifth, the assistant can reside not only on the telecommunication device but also on a telephony switch or server associated with the telecommunication device. The residence of the assistant on the switch or server can permit the assistant to interact with any telecommunication device, even though the device is not specifically designed for interaction with the assistant. Sixth, the assistant can be an ASIC or a software-only solution, thereby providing a high level of flexibility with implementing the assistant on existing telephony devices. Seventh, the assistant can provide multiple settings and/or statuses in response to a single query, thereby preventing users from having to speak or key in a series of separate commands. Although some prior art algorithms permit a ringer volume level to be played in response to a voice or DTMF command and other prior art algorithms announce the number of messages in voice mail in response to a voice or DTMF command, such algorithms do not permit a number of settings and/or function states to be accessed simultaneously in response to a single command or respond to a query (via a communications protocol) about the setting and/or status of another (discrete) telecommunication device. For example, the algorithm of the present invention in some configurations (in which the setting and/or status information is stored or set locally on the device or in associated system adjuncts rather than in the switch or server) permits a remote caller to obtain setting and/or status information of the caller's telecommunication device from a remote device.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
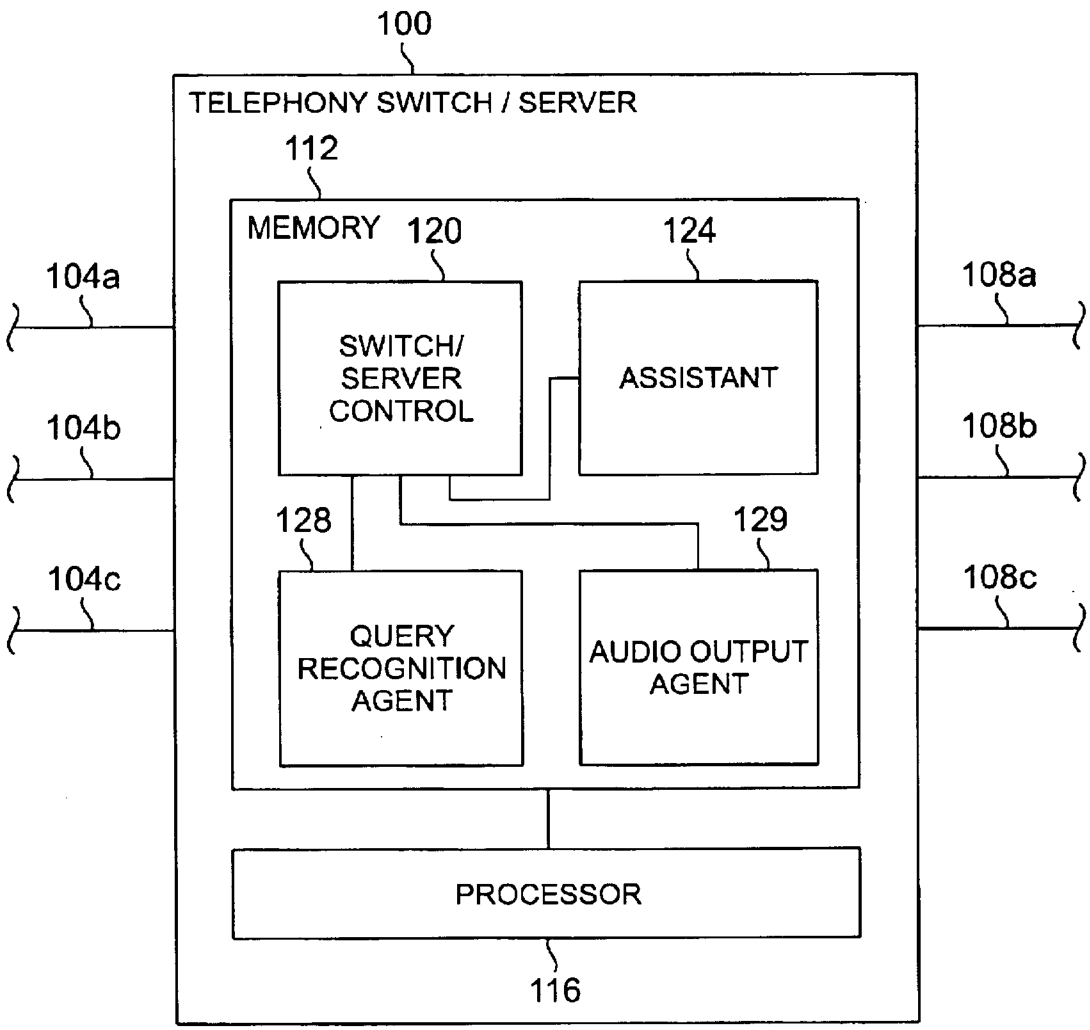
FIG. 1 is a block diagram depicting an assistant according to an embodiment of the present invention.

FIG. 1 depicts a telephony switch or server 100, such as a Private Branch Exchange or PBX or Automatic Call Distribution or ACD device, for switching connections or controlling calls between a plurality of internal and external lines 104*a–c* and 108*a–c*, respectively. As will be appreciated, the internal and external lines are in communication with one or more telecommunication devices, such as wired or wireless telephones, softphones, speakerphones, and mobile telephones. Typically, the telecommunication devices are nodes of the Public Switched Telephone Network or PSTN (not shown), a wide area network or WAN (not shown), and/or of a local area network or LAN. The switch or server 100 comprises memory 112 and processor 116. Memory 112 further comprises a switch or server control 120 for configuring desired connections between endpoints for effecting the desired connections, an assistant 124 to collect setting and status information about a feature, capability, endpoint or adjunct associated with the telephony switch or server 100, and a query recognition 128 to detect predetermined words or phrases in user commands and an audio output agent 129 to output auditory responses to the user. The residence of the assistant 124 on the switch or server 100 permits the assistant to interact with any telecommunication device or adjunct associated with or served by the switch or server 100.

The switch or server control 120 and connection logic can be any suitable telecommunications control architecture. An example of a suitable switch or server control is DEFINITY™ and PROLOGIX™, of Avaya, Inc. and MAGELLAN™ of Nortel.

The assistant 124 receives user queries for information regarding a feature setting and/or status of the user's communication device, of the switch or server, or of any associated system or adjunct. The query can be in the form of in-band tonal signaling (such as standard DTMF tones or the specialized tones used by assistive devices, e.g., the Baudot tones used by TTY's), digital non-acoustic signals triggered by special keys or buttons on the device, or voice command. As noted previously, communication device feature settings include speaker and/or microphone volume level, ringer volume level, whether the speaker and/or microphone is activated or deactivated, whether call forwarding is activated or deactivated, a date and/or time setting of the telecommunication device, whether do not disturb is activated or deactivated, the coverage path (i.e., where incoming calls will be forwarded if they are not answered), the starting and/or stopping times for time-dependent settings, the extent to which the battery is charged, the time remaining on the charge and the digital encoding algorithm currently in use (e.g., G.711, G.729, etc.). Communication device operational statuses or states include whether any lines are active and/or inactive, what lines are active and/or inactive, what lines have callers on hold and the identities of the callers, a number of callers on hold, whether any new and/or old messages are enqueued in voice mail, a number of new and/or old messages enqueued in voice mail, identification information associated with unanswered callers, the duration of the call, the length of time a call has been on hold, and the number and/or names of parties on a conference call.

Query recognition agent 128 can be any suitable speech recognition engine. Query recognition agent 128, for example, can be Avaya's SPEECH ACCESS™, UNIFIED COMMUNICATIONS™, and ANYWHERE ACCESS™. As will be appreciated, query recognition agent 128 detects the activation signal by comparing detected signal patterns to predetermined signal patterns.

Figure 2:
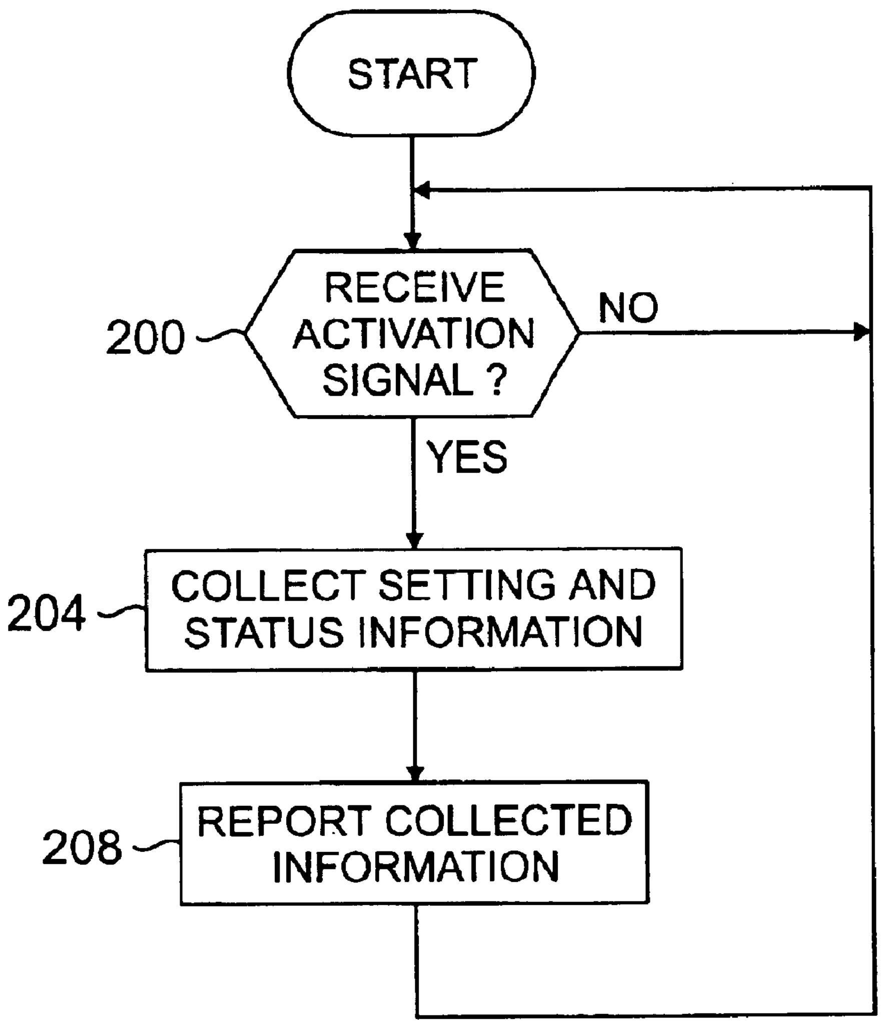
FIG. 2 is a flowchart depicting a first operational configuration of the assistant.

The operation of the assistant will now be discussed with reference to FIG. 2.

In step 200, the assistant 124 determines if an activation signal has been detected by and notice thereof received from the query recognition agent 128. The activation signal can be of any form, e.g., voice command that can be one or more words such as "WHAT ARE THE FEATURE SETTINGS?" and "WHAT IS THE TELEPHONE STATUS?", one or more DTMF signals generated by pressing one or more buttons of the telecommunication device, a digital non-acoustic signal that is triggered by pressing one or more buttons on the telecommunication device, and a specialized tone or signal that might be generated by an assistive device, such as a Baudot tone of the sort used by TTY's.

When the activation signal has not been received, the assistant 124 repeats step 200 either continuously or after a predetermined time interval has elapsed, such as after 1 second. As will be appreciated, the assistant is in a "sleep" mode awaiting a specific, predetermined word or phrase to be spoken to activate the assistant.

When notice of the activation signal has been received from the query recognition agent 128, the assistant 124 proceeds to step 204. In step 204, the assistant queries the telecommunications device and/or switch 100 for selected information about feature settings and operational status. The information collection can be done by any suitable technique as will be obvious to one of ordinary skill in the art. In the embodiment of FIG. 2, a predefined or predetermined script identifies what feature settings and operational status information is to be collected. The script may be a default (unprogrammable) script or a user configurable (programmable) script. When the script is pre-configured, it is not possible for the user to select at will only certain types of such information for collection.

When the information is collected, the assistant 124, in step 208, reports the collected information to the user by any suitable auditory technique. In one configuration, the information is reported by the audio output agent 129 generating pre-recorded audio (announcement) fragments and broadcasting the fragments over the speaker of the telecommunications device. An example, of such an announcement would be "Line one is on hold, line two is active, your handset is muted". The techniques for generating and broadcasting pre-recorded audio fragments are known to those skilled in the art. An example of a system using such pre-recorded audio fragments for other purposes is AUDIX™ by Avaya Inc. In another configuration, the audio output can be nonverbal. In this configuration, a series of distinctive or unique tones or other sounds, e.g., three quick clicks to indicate that there are three active lines, is used to provide setting and/or status information to the user. The advantage to quick nonverbal audio signals is that the feedback to the user would be extremely fast and would not disrupt a user's conversation. In yet another configuration, non-spoken audio output is used that is compatible with assistive devices such as TTY's. In another configuration, the voice stream could be text-to-speech. In that configuration, each word would be converted into speech and the collected, converted words broadcast audibly over the telecommunication device's speaker to the user. In view of the limited variety of announcements that would be required, the former configuration is preferred in most applications. Moreover, audio feedback of the information satisfies Federal requirements for blind users, accommodating people who have small portable devices, etc., though the subject invention does not preclude the use of visual feedback as an alternative method.

The reporting of collected information can occur at any time even during a communication with another party. When the user is engaged in a conversation with another party and requests feature and status information, the assistant 124 or switch or server control 120 can make appropriate adjustments to the active call's audio characteristics, such as temporarily muting the telecommunication device microphone and/or attenuating and then restoring the receive amplitude for the call. Otherwise, the other party to the call may hear the announcement of the feature and status information.

Figure 3:
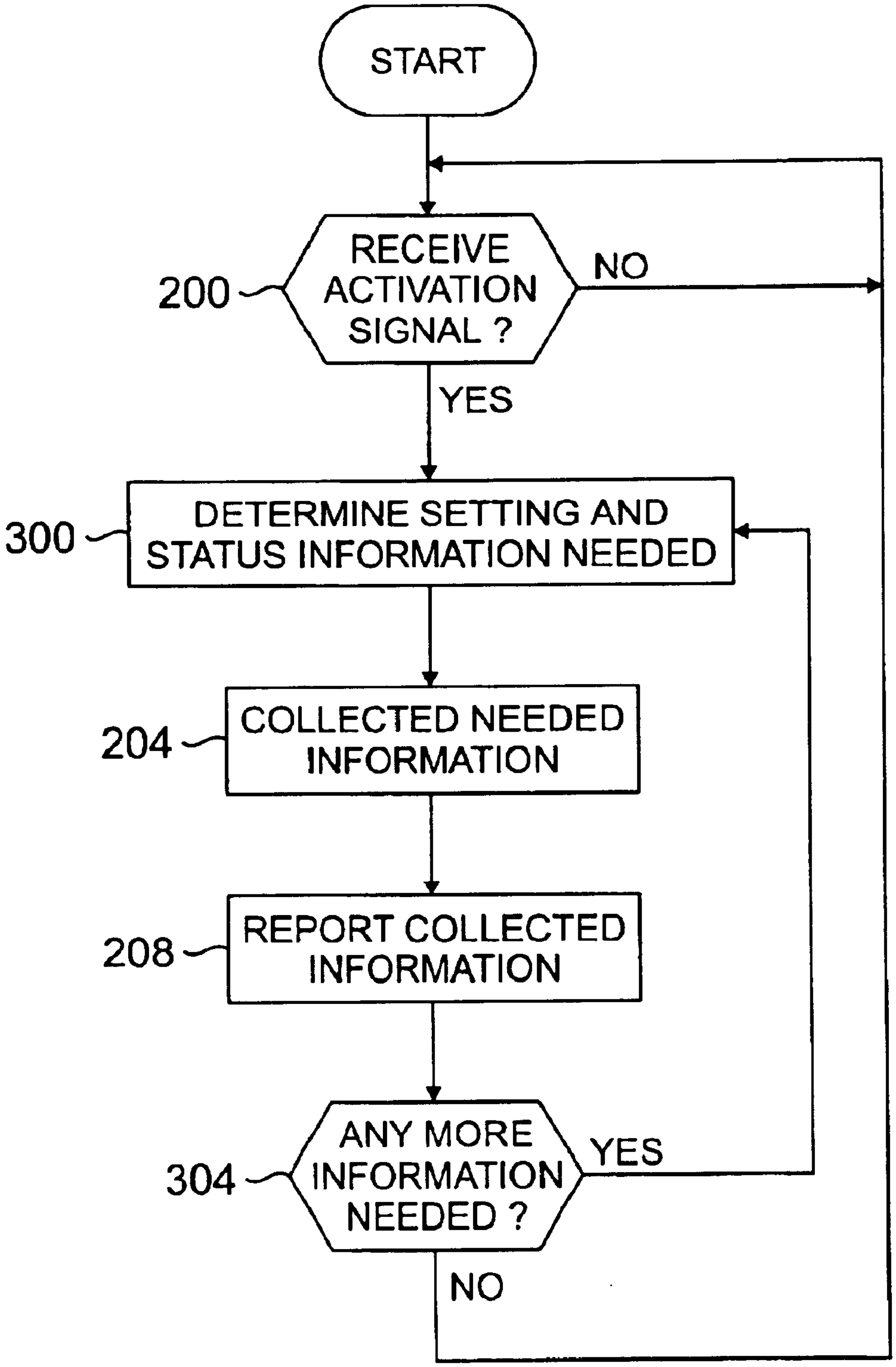
FIG. 3 is a flowchart depicting a second operational configuration of the assistant.

FIG. 3 depicts yet another operational embodiment of the present invention. Like reference numbers refer to like elements. This embodiment differs from that of FIG. 3 in that the assistant 124 queries the user interactively regarding what specific feature and/or status information is required rather than assuming that the user will want always want the same feature and/or status information.

Referring to FIG. 3, the assistant 124 in step 300 determines what setting and/or status information is being requested by the user. For example, the user can selectively and independently request information on the volume level, the call forwarding setting, the number of messages in voice mail, the identification of a caller or a party holding on a specified line, etc. The assistant 124, in step 204, collects the information and, in step 208, reports the information to the user. In step 304, the assistant 124 prompts the user for any additional information collection requests. This is typically done by using an audio announcement such as "Do you need any other information?". The assistant then waits for a response. If no response is received after a predetermined time interval has elapsed, the assistant may make a further announcement, such as "Thank you", and return to step 200. If a response is received within the predetermined time interval, the assistant returns to step 300. In this embodiment, a user can request different types of information at different times, as desired.

In one configuration, the assistant can also assist the user in resetting the selected feature. For example, after reporting a feature setting to a user the assistant can then ask the user if the feature setting is to be changed. The user can then interact with the assistant and change the feature setting.

A number of variations and modifications of the invention can be used. It would be possible to provide for some features of the invention without providing others. For example in one alternative embodiment, the assistant 124 resides on the endpoint device itself in addition to or in lieu of residing on the switch or server 100. In another alternative embodiment, the assistant is an ASIC located in either the telecommunication device or switch or server 100. In yet another alternative embodiment, the assistant can use the methods of either FIG. 2 or 3, at the request of the user. The user can provide a command to the assistant to perform the steps of FIG. 2 or provide a different command to perform the steps of FIG. 3.

In yet a further alternative embodiment, assistant 124 resides in an adjunct server connected to the switch/server 100 and/or to the endpoint via a computer-telephony integration or CTI interface.

In yet another alternative embodiment, switch/server control 120, assistant 124, query recognition agent, and/or speech output agent can be implemented, in whole or part, as an application specific integrated circuit or any other type of logic circuit.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for providing to a user at least one of current setting and status information associated with a telecommunication device, comprising:

receiving a request for the at least one of current setting and status information;

collecting the requested at least one of current setting and status information; and audibly providing the requested at least one of current setting and status information to the user, wherein the at least one of current setting and status information comprises two or more of a speaker volume level, a microphone volume level, a ringer volume level, whether the speaker is activated, whether the microphone is activated, whether the speaker is deactivated, whether the microphone is deactivated, whether call forwarding is activated, whether call forwarding is deactivated, a date setting of the device, a time setting of the device, whether do not disturb is activated, whether do not disturb is deactivated, a coverage path, a starting time for one or more time-dependent settings, a stopping time for one or more time-dependent settings, a charge level of a power source of the device, a time remaining on the charge level, an identity of a digital encoding algorithm currently in use by the device, whether any lines are active, whether any lines are inactive, what lines are active, what lines are inactive, what lines have callers on hold, a number of callers on hold, whether any new and/or old messages are enqueued in voice mail, a number of new and/or old messages enqueued in voice mail, identification information associated with at least one caller, the duration of the call, a length of time the call has been on hold, a number of parties on the call, and the names of parties on the call.

2. The method of claim 1, wherein the at least one of current feature and status information is current setting information and wherein the current setting information comprises two or more of a speaker volume level, a microphone volume level, a ringer volume level, whether the speaker is activated, whether the microphone is activated, whether the speaker is deactivated, whether the microphone is deactivated, whether call forwarding is activated, whether call forwarding is deactivated, a date setting of the device, a time setting of the device, whether do not disturb is activated, whether do not disturb is deactivated, a coverage path, a starting time for one or more time-dependent settings, a stopping time for one or more time-dependent settings, a charge level of a power source of the device, a time remaining on the charge level, and an identity of a digital encoding algorithm currently in use by the device.

3. The method of claim 1, wherein the at least one of current feature and status information is current status information and wherein the current status information comprises two or more of whether any lines are active, whether any lines are inactive, what lines are active, what lines are inactive, what lines have callers on hold, a number of callers on hold, whether any new and/or old messages are enqueued in voice mail, a number of new and/or old messages enqueued in voicemail, identification information associated with at least one caller, the duration of the call, a length of time the call has been on hold, a number of parties on the call, and the names of parties on the call.

4. The method of claim 1, wherein the request is a voice and/or tone communication from the user.

5. The method of claim 1, wherein the at least one of current setting and status information collected is determined by a predefined script and further comprising:

receiving a configuration request from the user to alter the predefined script; and altering the predefined script in accordance with the configuration request.

6. The method of claim 1, wherein the providing step comprises:

selecting at least one pre-recorded audio word and/or phrase describing the collected at least one of current setting and status information; and broadcasting the selected at least one pre-recorded audio word and/or phrase over a speaker in the telecommunication device.

7. The method of claim 6, further comprising:

muting a microphone of the telecommunication device.

8. The method of claim 6, further comprising:

before the broadcasting step, attenuating a receive volume associated with the telecommunication device; and after the broadcasting step, restoring the receive volume.

9. The method of claim 1, further comprising:

receiving a request to change a setting associated with the telecommunication device; and changing the setting.

10. The method of claim 1, wherein in the receiving step the request is for a user identified set of setting and status information.

11. The method of claim 10, further comprising: prompting the user for additional setting and status information for collection.

12. A system for providing to a user at least one of current setting and status information associated with a telecommunication device, comprising:

means for receiving a request for the at least one of current setting and status information;

means for collecting the requested at least one of current setting and status information; and means for providing audibly the requested at least one of current setting and status information to the user, wherein the at least one of current setting and status information comprises two or more of a speaker volume level, a microphone volume level a ringer volume level, whether the speaker is activated, whether the microphone is activated, whether the speaker is deactivated, whether the microphone is deactivated, whether call forwarding is activated, whether call forwarding is deactivated, a date setting of the device, a time setting of the device, whether do not disturb is activated, whether do not disturb is deactivated, a coverage path, a starting time for one or more time-dependent settings, a stopping time for one or more time-dependent settings, a charge level of a power source of the device, a time remaining on the charge level, an identity of a digital encoding algorithm currently in use by the device, whether any lines are active, whether any lines are inactive, what lines are active, what lines are inactive, what lines have callers on hold, a number of callers on hold, whether any new and/or old messages are enqueued in voice mail, a number of new and/or old messages enqueued in voice mail, identification information associated with at least one caller, the duration of the call, a length of time the call has been on hold, a number of parties on the call, and the names of parties on the call.

13. The system of claim 12, wherein the at least one of current feature and status information is current setting information and wherein the current setting information comprises two or more of a speaker volume level, a microphone volume level, a ringer volume level, whether the speaker is activated, whether the microphone is activated, whether the speaker is deactivated, whether the microphone is deactivated, whether call forwarding is activated, whether call forwarding is deactivated, a date setting of the device, a time setting of the device, whether do not disturb is activated, whether do not disturb is deactivated, a coverage path, a starting time for one or more time-dependent settings, a stopping time for one or more, time-dependent settings, a charge level of a power source of the device, a time remaining on the charge level, and an identity of a digital encoding algorithm currently in use by the device.

14. The system of claim 12, wherein the at least one of current feature and status information is current status information and wherein the current status information comprises two or more of whether any lines are activate, whether any lines are inactive, what lines are active, what lines are inactive, what lines have callers on hold, a number of callers on hold, whether any new and/or old messages are enqueued in voice mail, a number of new and/or old messages enqueued in voice mail, identification information associated with at least one caller, the duration of the call, a length of time the call has been on hold, a number of parties on the call, and the names of parties on the call.

15. The system of claim 12, wherein the request is a voice and/or tone communication from the user.

16. The system of claim 12, wherein the at least one of current setting and status information collected is determined by a predefined script and further comprising;

means for receiving a configuration request from the user to alter the predefined script; and means for altering the predefined script in accordance with the configuration request.

17. The system of claim 12, wherein the providing means comprises:

means for selecting at least one pre-recorded audio word and/or phrase describing the collected at least one of current setting and status information; and means for broadcasting the selected at least one pre-recorded audio word and/or phrase over a speaker in the telecommunication device.

18. The system of claim 17, further comprising:

means for muting a microphone of the telecommunication device.

19. The system of claim 17, further comprising:

means for attenuating, before the broadcasting step, a receive volume associated with the telecommunication device; and means for restoring, after the broadcasting step, the receive volume.

20. The system of claim 12, further comprising:

means for receiving a request to change a setting associated with the telecommunication device; and means for changing the setting.

21. The system of claim 12, wherein the request is for a user identified set of setting and status information.

22. The system of claim 21, further comprising:

means for prompting the user for additional setting and status information for collection.

23. The system of claim 12, wherein the means for collecting resides on at least one of a telephony switch and telephony server.

24. A system for providing to a user at least one of current setting and status information associated with a voice telecommunication device, comprising:

an input configured to receive a request for the at least one of current setting and status information;

an assistant configured to collect the requested at least one of current setting and status information; and an output configured to provide the requested at least one of current setting and status information to the user, wherein the at least one of current setting and status information comprises two or more of a speaker volume level, a microphone volume level, a ringer volume level, whether the speaker is activated, whether the microphone is activated, whether the speaker is deactivated, whether the microphone is deactivated, whether call forwarding is activated, whether call forwarding is deactivated, a date setting of the device, a time setting of the device, whether do not disturb is activated, whether do not disturb is deactivated, a coverage path, a starting time for one or more time-dependent settings, a stopping time for one or more time-dependent settings, a charge level of a power source of the device, a time remaining on the charge level, an identity of a digital encoding algorithm currently in use by the device, whether any lines are active, whether any lines are inactive, what lines are active, what lines are inactive, what lines have callers on hold, a number of callers on hold, whether any new and/or old messages are enqueued in voice mail, a number of new and/or old messages enqueued in voice mail, identification information associated with at least one caller, the duration of the call, a length of time the call has been on hold, a number of parties on the call, and the names of parties on the call.

25. The system of claim 24, wherein the at least one of current feature and status information is audibly provided to the user, wherein the at least one of current feature and status information is current setting information, and wherein the current setting information comprises one or more of speaker volume level, a microphone volume level, whether the speaker is activated and/or deactivated, whether the microphone is activated and/or deactivated, whether call forwarding is activated and/or deactivated, a date setting of the telecommunication device, a time setting of the telecommunication device, whether do not disturb is activated and/or deactivated, a coverage path, a starting time for one or more time-dependent settings, a stopping time for one or more time-dependent settings, a charge level of a power source of the device, a time remaining on the charge level, and an identity of a digital encoding algorithm currently in use by the device.

26. The system of claim 24, wherein the at least one of current feature and status information is audibly provided to the user, wherein the at least one of current feature and status information is current status information, and wherein the current status information comprises one or more of whether any lines are active and/or inactive, what lines are active and/or inactive, what lines have callers on hold, a number of callers on hold, whether any new and/or old messages are enqueued in voice mail, a number of new and/or old messages enqueued in voice mail, the duration of the call, a length of time the call has been on hold, a number of parties on the call, and the names of parties on the call.

27. The system of claim 24, wherein the request is a voice and/or tone communication from the user.

28. The system of claim 24, wherein the at least one of current setting and status information collected is determined by a predefined script and wherein the input is configured to receive a configuration request from the user to alter the predefined script and the assistant is configured to alter the predefined script in accordance with the configuration request.

29. The system of claim 24, wherein the assistant is configured to select at least one pre-recorded audio word and/or phrase describing the collected at least one of current setting and status information and broadcast an audio stream comprising the selected at least one pre-recorded audio word and/or phrase over a speaker in the telecommunication device.

30. The system of claim 29, wherein the assistant is configured to mute a microphone of the telecommunication device.

31. The system of claim 29, wherein the assistant is configured to attenuate, before the broadcasting step, a receive volume associated with the telecommunication device and restore, after the broadcasting step, the receive amplitude.

32. The system of claim 24, wherein the input is configured to receive a request to change a setting associated with the telecommunication device and the assistant is configured to change the setting.

33. The system of claim 24, wherein the request is for a user identified set of current setting and status information.

34. The system of claim 33, wherein the assistant is configured to prompt the user for additional current setting and status information for collection.

35. The system of claim 24, wherein the assistant resides on at least one of the telecommunication device, a switch, and a server.

36. The system of claim 24 wherein the assistant collects at least three of the following types of current setting and status information: a speaker volume level, a microphone volume level, a ringer volume level, whether the speaker is activated, whether the microphone is activated, whether the microphone is deactivated, whether call forwarding is activated, whether call forwarding is deactivated, a date setting of the telecommunication device, a time setting of the telecommunication device, whether do not disturb is activated, whether do not disturb is deactivated, whether any lines are active, whether any lines are inactive, what lines are active, what lines are inactive, what lines have callers on hold, a number of callers on hold, whether any new message is enqueued in voice mail, whether any old message is enqueued in voice mail, a number of new messages enqueued in voice mail, a number of old messages enqueued in voice mail, a total number of messages enqueued in voice mail, a coverage path, a starting time for one or more time-dependent settings, a stopping time for one or more time-dependent settings, a charge level of a power source of the device, a time remaining on the charge level, and an identity of a digital encoding algorithm currently in use by the device.

37. A method for providing to a user at least one of setting and status information associated with a telecommunication device, comprising:

receiving a request for the at least one of setting and status information;

collecting the requested at least one of setting and status information; and providing the requested at least one of setting and status information to the user, wherein the providing step comprises:

selecting at least one pre-recorded audio word and/or phrase describing the collected at least one of setting and status information; and broadcasting the selected at least one pre-recorded audio word and/or phrase over a speaker in the telecommunication device.

38. The method of claim 37, further comprising:

muting a microphone of the telecommunication device.

39. The method of claim 37, further comprising:

before the broadcasting step, attenuating a receive volume associated with the telecommunication device; and after the broadcasting step, restoring the receive volume.

40. A system for providing to a user at least one of setting and status information associated with a telecommunication device, comprising:

an input configured to receive a request for the at least one of setting and status information;

an assistant configured to collect the requested at least one of setting and status information; and an output configured to provide the requested at least one of setting and status information to the user, wherein the assistant is configured to select at least one pre-recorded audio word and/or phrase describing the collected at least one of setting and status information and broadcast an audio stream comprising the selected at least one pre-recorded audio word and/or phrase over a speaker in the telecommunication device.

41. The system of claim 40, wherein the assistant is configured to mute a microphone of the telecommunication device.

42. The system of claim 40, wherein the assistant is configured to attenuate, before the broadcasting step, a receive volume associated with the telecommunication device and restore, after the broadcasting step, the receive amplitude.

* * * * *